(12) United States Patent
Sankaranarayanan et al.

(10) Patent No.: US 12,050,669 B2
(45) Date of Patent: Jul. 30, 2024

(54) CLOUD BASED MACHINE LEARNING MODEL ATTACK GUARD

(71) Applicant: Oracle International Corporation, Redwood Shores, CA (US)

(72) Inventors: Hari Bhaskar Sankaranarayanan, Bangalore (IN); Jean-Rene Gauthier, Temecula, CA (US); Dwijen Bhattacharjee, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 259 days.

(21) Appl. No.: 17/685,577

(22) Filed: Mar. 3, 2022

(65) Prior Publication Data
US 2023/0281281 A1  Sep. 7, 2023

(51) Int. Cl.
*G06F 21/14* (2013.01)
*G06N 20/00* (2019.01)

(52) U.S. Cl.
CPC ............. *G06F 21/14* (2013.01); *G06N 20/00* (2019.01)

(58) Field of Classification Search
CPC ................................ G06F 21/14; G06N 20/00
USPC ............................................................ 726/2
See application file for complete search history.

(56) References Cited

U.S. PATENT DOCUMENTS

| | | | |
|---|---|---|---|
| 9,705,914 B2 | 7/2017 | Di Pietro et al. | |
| 10,733,287 B2 | 8/2020 | Kesarwani et al. | |
| 10,824,721 B2 | 11/2020 | Kesarwani et al. | |
| 2019/0095629 A1* | 3/2019 | Lee | G06N 3/08 |
| 2019/0156247 A1* | 5/2019 | Faulhaber, Jr. | G06N 3/045 |
| 2019/0258783 A1* | 8/2019 | Mehta | G06N 20/00 |
| 2020/0234184 A1* | 7/2020 | Kesarwani | G06F 16/90335 |
| 2020/0302524 A1* | 9/2020 | Kamkar | G06Q 10/067 |
| 2021/0174453 A1* | 6/2021 | Anderson | G06Q 10/10 |
| 2022/0029972 A1* | 1/2022 | Gharibi | H04L 9/008 |
| 2023/0274003 A1* | 8/2023 | Liu | G06N 3/094 |
| | | | 726/26 |

OTHER PUBLICATIONS https://arxiv.org/pdf/1610.05820; Shokri et al., 2017; Membership inference attacks against machine learning models (Year: 2017).*

* cited by examiner

*Primary Examiner* — Hee Soo Kim
(74) *Attorney, Agent, or Firm* — Potomac Law Group, PLLC

(57) ABSTRACT

Embodiments prevent a reverse engineering attack on a machine learning ("ML") model. Embodiments receive a first set of requests from a plurality of users to the ML model. Based on the first set of requests, embodiments identify a first user attempting to attack the ML model and, in response to the identifying, generate a shadow model that is similar to the ML model. Embodiments receive a second set of requests from the first user to the ML model and, in response to the second set of requests, generate an ML model set of responses and a shadow model set of responses. Embodiments compare the ML model set of responses with the shadow model set of responses and, based on the comparison, determine whether the first user is attempting the reverse engineering attack on the ML model.

20 Claims, 8 Drawing Sheets

CLOUD BASED MACHINE LEARNING MODEL ATTACK GUARD

FIELD

One embodiment is directed generally to a computer system, and in particular to a machine learning model hosted in a cloud based computer system.

BACKGROUND INFORMATION

Cloud service providers provide various services in the "cloud", meaning over a network, such as the public Internet, and remotely accessible to any network-connected client device. Examples of the services models used by cloud service providers (also referred to herein as "cloud providers" or "providers") include infrastructure as a service ("IaaS"), platform as a service ("PaaS"), software as a service ("SaaS"), and network as a service ("NaaS"). IaaS providers provide customers with infrastructure resources such as processing, storage, networks, and other computing resources that the customer is able to use to run software. The customer does not manage the infrastructure, but has control over operating systems, storage, and deployed applications, among other things, and may be able to control some networking components, such as firewalls. PaaS providers provide a customer with a platform on which the customer can develop, run, and manage an application without needing to maintain the underlying computing infrastructure. SaaS is a software licensing and delivery model in which software is licensed to a customer on a subscription basis, and is centrally hosted by the cloud provider. Under this model, applications can be accessed, for example, using a web browser. NaaS providers provide network services to customers, for example, by provisioning a virtual network on the network infrastructure operated by another party. In each of these service models, the cloud service provider maintains and manages the hardware and/or software that provide the services, and little, if any, software executes on a user's device.

Customers of cloud service providers, which are also referred to herein as users and tenants, can subscribe to the service provider to obtain access to the particular services provided by the service provider. The service provider can maintain an account for a user or tenant, through which the user and/or tenant can access the provider's services. The service provider can further maintain user accounts that are associated with the tenant, for individual users.

One service provided by cloud service providers is developing, training, and using machine learning models. The cloud makes it easy for enterprises to experiment with machine learning capabilities and scale up as projects go into production and demand increases. The cloud makes intelligent capabilities accessible without requiring advanced skills in artificial intelligence or data science. However, as with all network based resources, cloud based machine learning models may be subjected to illicit attacks.

SUMMARY

Embodiments prevent a reverse engineering attack on a machine learning ("ML") model. Embodiments receive a first set of requests from a plurality of users to the ML model. Based on the first set of requests, embodiments identify a first user attempting to attack the ML model and, in response to the identifying, generate a shadow model that is similar to the ML model. Embodiments receive a second set of requests from the first user to the ML model and, in response to the second set of requests, generate an ML model set of responses and a shadow model set of responses. Embodiments compare the ML model set of responses with the shadow model set of responses and, based on the comparison, determine whether the first user is attempting the reverse engineering attack on the ML model.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Figure 1:
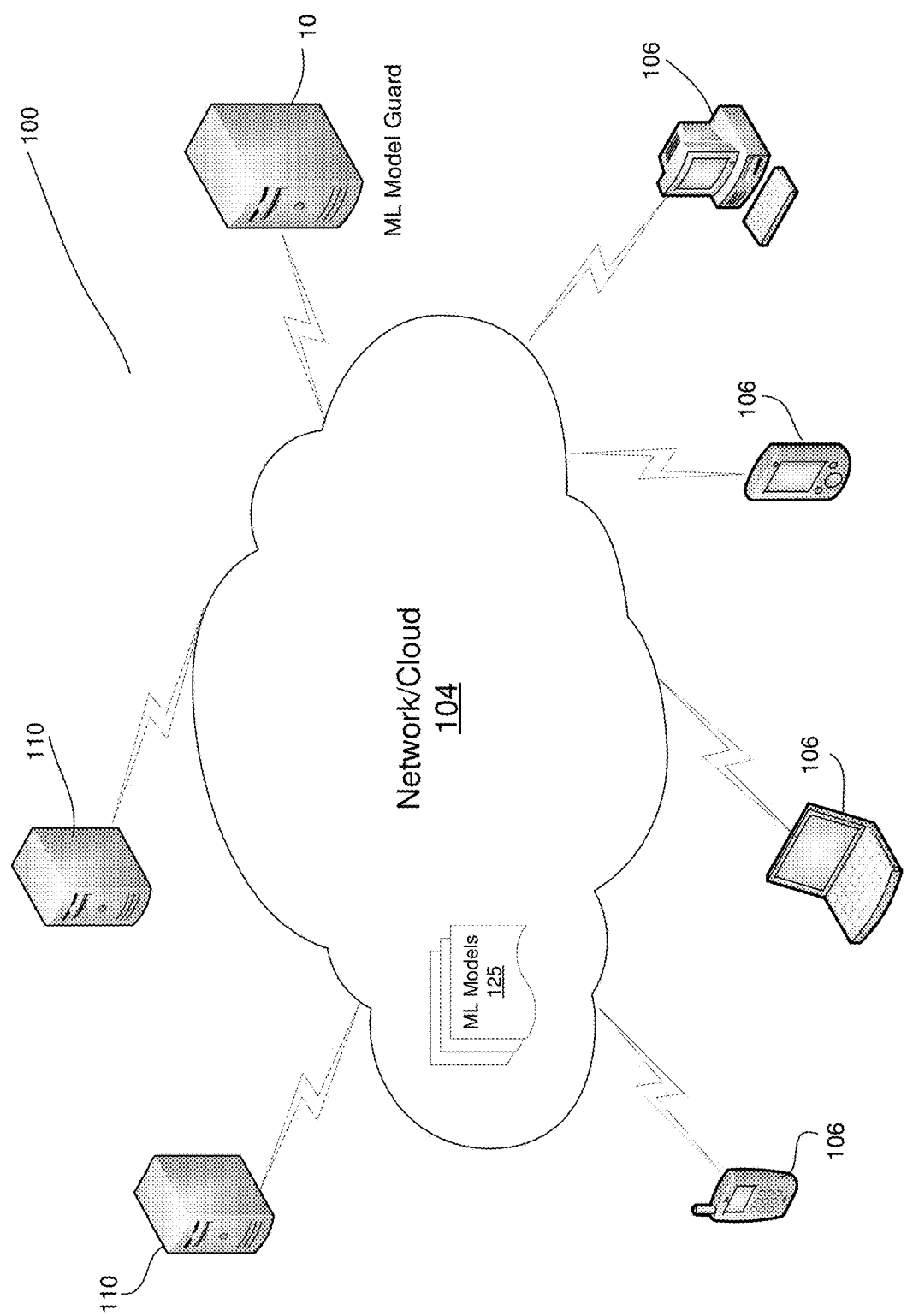
FIG. 1 illustrates an example of a system that includes an ML model guard system in accordance to embodiments.

One embodiment thwarts model extraction attacks on a cloud based machine learning model by generating a shadow model training pipeline. Embodiments monitor feature vectors and alert a "model guard" when necessary to thwart an assumed malicious attack.

As disclosed, machine learning ("ML") models are increasingly being deployed on cloud infrastructures as machine learning as a service model. Machine learning as a service model means that the machine learning model is deployed and accessible to at least one entity other than the machine learning model owner. The other entity can use or access the machine learning model to perform some task or service for the entity.

For example, the entity may need a recommendation machine learning model for providing purchase recommendations based on past purchases by users. Rather than generating the recommendation machine learning model, the entity may simply use a machine learning model that has been deployed as a service. The entity usually pays per usage of the machine learning model. The machine learning model owner also gains a larger visibility for the machine learning model, meaning that if the machine learning model owner is attempting to train the model using feedback from users, the machine learning model is exposed to more users and feedback. From the perspective of the entity using the machine learning model, the entity does not have to purchase and manage expensive hardware or software and does not need to create the machine learning model. However, the machine learning model as a service suffers from the problem that, since the model is exposed to the public, users may attempt to attack the model.

Although all software applications are subject to attacks and threats from malicious actors, ML models are a different and potentially valuable target of attacks because they contain a representation of the training dataset they were trained on. Specifically, in a machine learning model, the training data, feature set, learning algorithm and architecture, hyperparameters, objective function, and trained model parameters (i.e., weights) may all be sensitive or confidential information. However, machine learning models can be the target of attacks where the confidentiality or the privacy of the model and data can be compromised.

In general, known solutions for thwarting machine learning model attacks have focused on identifying how attacks occur and, therefore, an identification of the attacks. Based upon the identification of the types of attacks and how the attacks are carried out, developers of machine learning models have attempted to develop machine learning models that are not as susceptible to the attacks (e.g., by making the machine learning model, the algorithms used to create the machine learning model, and the training data used for training the machine learning model more complex). However, such an approach is not feasible for all types of machine learning models. For example, certain types of machine learning models that may not be as resistant to certain attacks may be the type of machine learning model that needs to be deployed for a particular application. Additionally, a complex machine learning model may be resistant to certain attacks, but may be susceptible to other attacks. Consequently, strengthening one feature of a machine learning model may make the machine learning model vulnerable to other types of attacks.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates an example of a system 100 that includes an ML model guard system 10 in accordance to embodiments. ML model guard system 10 may be implemented within a computing environment that includes a communication network/cloud 104. Network 104 may be a private network that can communicate with a public network (e.g., the Internet) to access services 110 provided by a cloud services provider. Examples of communication networks include a mobile network, a wireless network, a cellular network, a local area network ("LAN"), a wide area network ("WAN"), other wireless communication networks, or combinations of these and other networks. ML model guard system 10 may be administered by a service provider, such as via the Oracle Cloud Infrastructure ("OCI") from Oracle Corp.

Tenants of the cloud services provider can be organizations or groups whose members include users of services offered by service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of ML model guard system 10 of thwarting ML model attacks. As disclosed herein, a "client" (also disclosed as a "client system" or a "client device") may be a device or an application executing on a device. System 100 includes a number of different types of client devices 106 that each is able to communicate with network 104.

Executing on cloud 104 are one or more ML models 125. Each ML model 125 can be executed by a customer of cloud 104. In embodiments, an ML model 125 can be accessible to a client 106 via a representational state transfer application programming interface ("REST API") and function as an endpoint to the API. ML models 125 can by any type of machine learning model that, in general, is trained on some training data and then can process additional data to make predictions. Examples of ML models 125 include artificial neural networks ("ANN"), decision trees, support-vector machines ("SVM"), Bayesian networks, etc. Training data can be any set of data capable of training ML model 125 (e.g., a set of features with corresponding labels, such as labeled data for supervised learning). In embodiments, training data can be used to train a ML model 125 to generate a trained ML model 125.

In embodiments, each customer can build an ML model 125 using an ML or "data science" notebook. ML notebooks are highly-interactive multi-purpose tools that allow a data scientist to write and execute code and, at the same time, analyze intermediate results to gain insights, using tables or visualizations, while working on a project. Example ML notebooks include the open source "Jupyter Notebook" and "Apache Zeppelin" ML notebooks. ML notebook are generally implemented as a computational interpreter. In general, embodiments can be implemented with any type of ML notebooks that interface with an ML notebook server, including the Jupyter Notebook and any other Python based notebook (referred to generically as a "Python notebook").

In one embodiment, "Oracle Machine Learning Notebooks" from Oracle Corp. are implemented as ML notebooks that can be used to generate ML models 125. Oracle ML Notebooks provide a collaborative user interface for data scientists and business and data analysts who perform machine learning in Oracle Autonomous Database—both Autonomous Data Warehouse ("ADW") and Autonomous Transaction Processing ("ATP"). Oracle Machine Learning Notebooks enable data scientists, citizen data scientists, and data analysts to work together to explore their data visually and develop analytical methodologies. An interface provides access to high performance, parallel and scalable in-database implementations of machine learning algorithms via SQL and PL/SQL, with support for Python and R. Oracle ML Notebooks use Apache Zeppelin technology, enabling teams to collaborate to build, assess, and deploy machine learning models. Multi-user collaboration enables the same notebook to be opened simultaneously by different users, such that notebook changes made by one user are instantaneously reflected to notebook viewers.

In other embodiments, ML models 125 can be built and trained using any other methods. For example, ML models can be built and trained in machine learning pipelines, on virtual machines or bare metal machines, in serverless batch execution engines, in "drag-and-drop" GUIs, etc.

Figure 2:
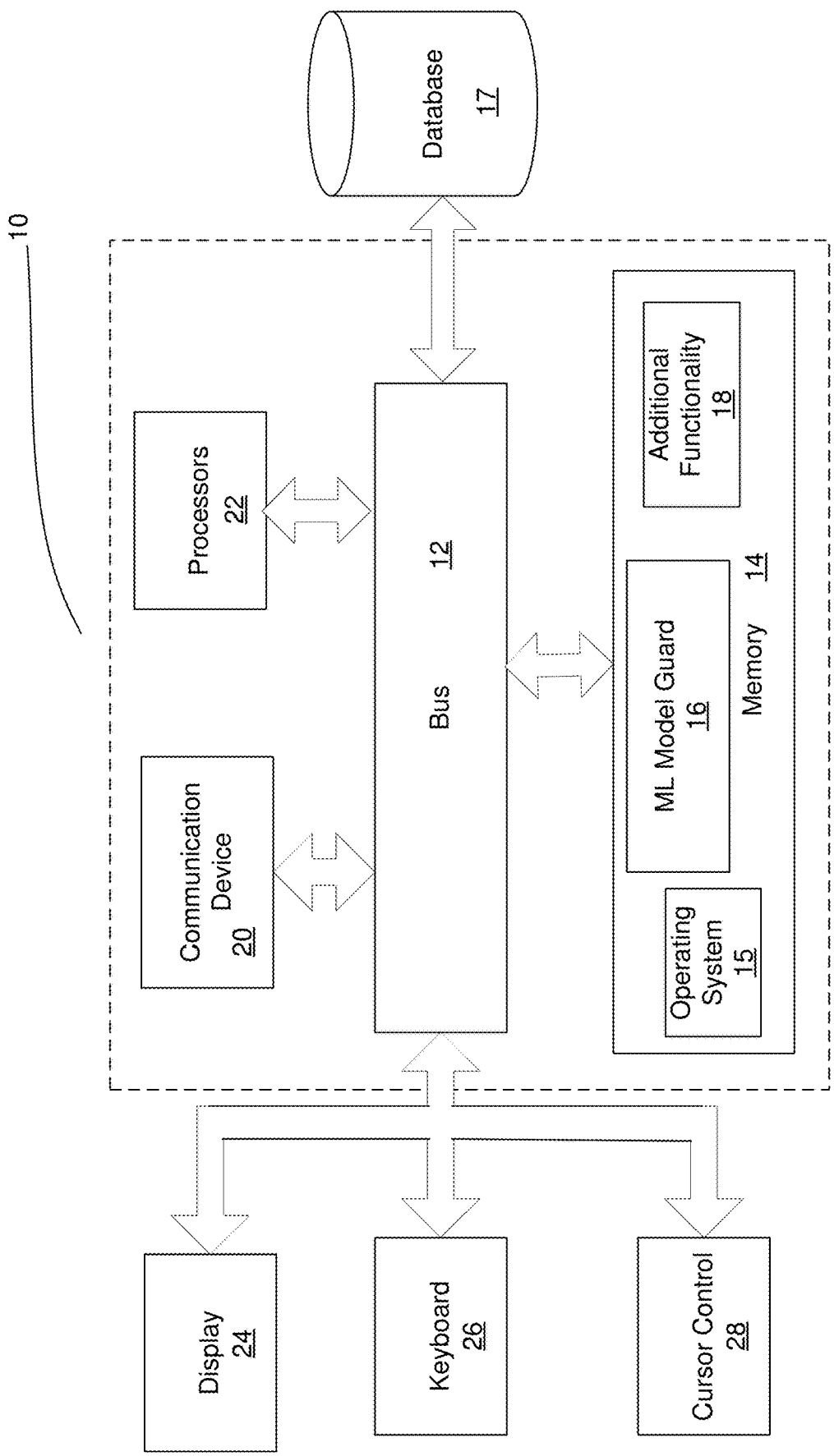
FIG. 2 is a block diagram of the ML model guard system of FIG. 1 in the form of a computer server/system in accordance with an embodiment of the present invention.

FIG. 2 is a block diagram of ML model guard system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an ML model guard module 16 that thwarts attacks on ML models 125 on cloud 104, and all other functionality disclosed herein. System 10 can be part of a larger system. Therefore, system 10 can include one or more additional functional modules 18 to include the additional functionality, such as any other functionality provided by the Oracle Cloud Infrastructure ("OCI") from Oracle Corp. A file storage device or database 17 is coupled to bus 12 to provide centralized storage for modules 16 and 18, including a shadow model training pipeline. In one embodiment, database 17 is a relational database management system ("RDBMS") that can use Structured Query Language ("SQL") to manage the stored data.

In one embodiment, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

As disclosed, ML models 125 made available on cloud 104 as a service are particularly subjected to attack. One class of attacks is referred to as "model extraction attacks." Model extraction attacks occur when an attacker poses as a client of the ML model, and consequently only has black-box access to the model (i.e., request-response access only, with no prior knowledge of the ML algorithm, hyperparameters, parameters, etc.). The attacker submits inference requests to the model endpoint, obtains model predictions, and reconstructs an equivalent surrogate machine learning model that behaves very similar to the original model, therefore reverse engineering the model.

For example, if there is a pre-built language service ML model for detecting semantics in written words/sentences and that has been trained using training datasets obtained from "Wikipedia", users can send requests based on "Wikipedia" text mining and figure out how to circumvent the models or even attempt to modify the source itself such as acts of Wikipedia vandalism. Even more problematic, the attackers/hackers can expose the model data or algorithm to the public domain for further exploitation such as any other security vulnerabilities. The attacker can then use the surrogate model for other attacks, including evasion, adversarial, or other threats that could compromise the integrity or availability of the model. Known solutions and responses to prevent and/or resolve this type of attack would include retraining the ML model using some other text dataset other than Wikipedia, and/or changing the algorithm that forms the ML model.

In contrast, in order to prevent model extraction attacks, embodiments create a shadow ML model training pipeline. Embodiments monitor the feature vectors (i.e., prediction requests) submitted to the model inference endpoint by clients (including potential attackers). Embodiments use those feature vectors as training datasets for the shadow ML models. The shadow ML models are re-trained and monitored periodically as new feature vectors are submitted to the ML model endpoint.

Embodiments can leverage its white-box knowledge of the original ML model 125 to measure a similarity score between the shadow models and the original model. When the similarity score reaches a certain level, the shadow model pipeline can send an alert to an additional component, referred to as the "model guard". The model guard sits in front of the ML model 125 and can filter, block, and modify responses from the model inference endpoint. The model guard can prevent malicious clients from extracting the model by a combination of one or more of the following protective measures:

Removing all class probabilities for classification problems;
Only returning the predicted class label;
Adding noise to the prediction probabilities;
Throttling the requests; and
Blocking the requests.

Figure 3:
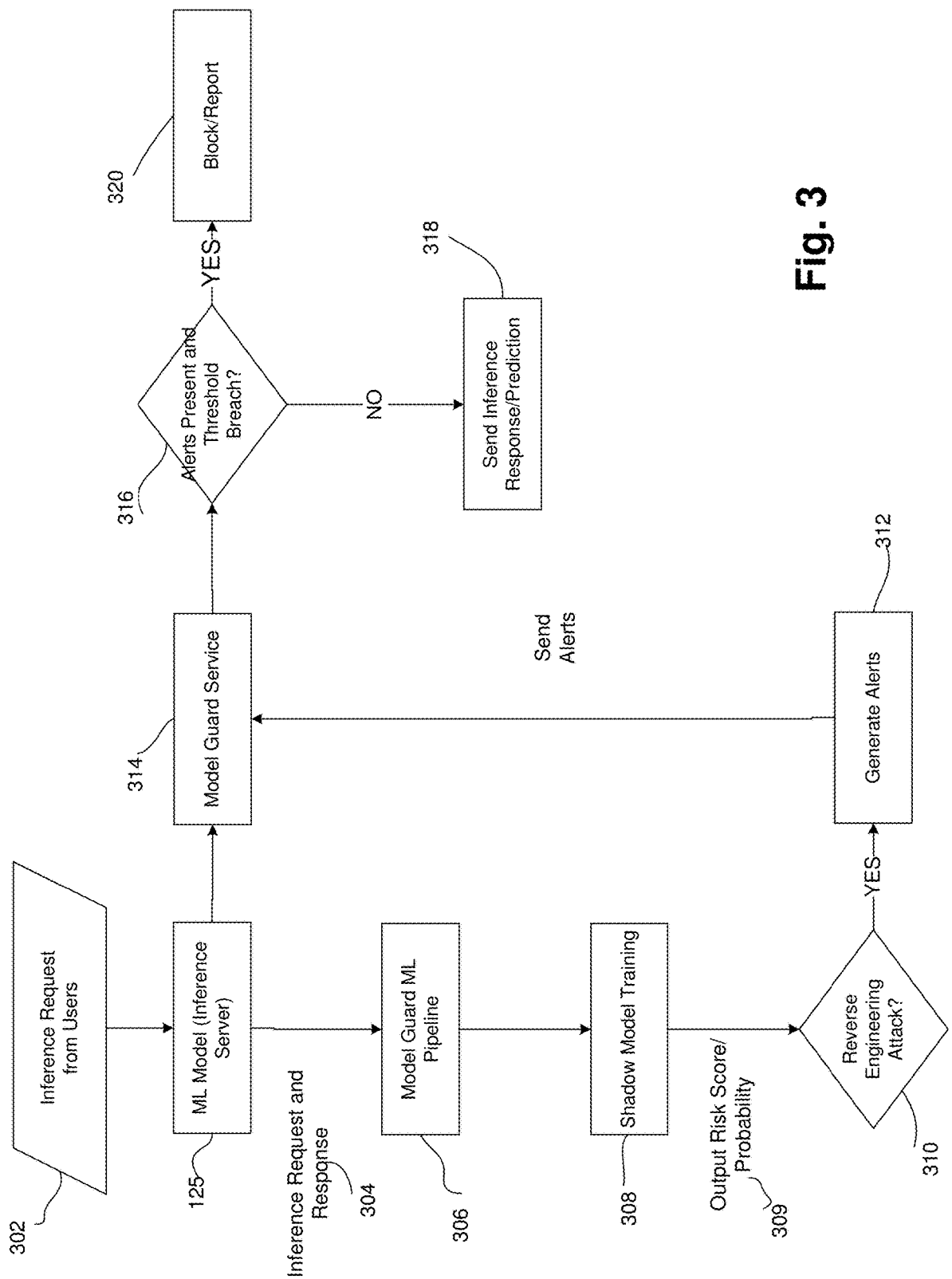
FIG. 3 is a flow diagram/block diagram of the functionality of the system of FIG. 1 for guarding an ML model from attacks in accordance with one embodiment.

FIG. 3 is a flow diagram/block diagram of the functionality of system 10 of FIG. 1 for guarding an ML model 125 from attacks in accordance with one embodiment. In one embodiment, the functionality of the flow diagram of FIG.

3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 3 is on a per ML model 125 basis, so that each of ML models 125 may have corresponding functionality of FIG. 3, including a corresponding ML model guard.

At 302, inference/prediction requests are received from users of an ML model 125 via cloud 104 using ML model 125 as an endpoint. An inference request includes a feature vector, which, in general is the input that ML model 125 requires to make a prediction. The inference request may also include additional metadata including, for example, the client ID, the operating system of the client, the browser of the client, etc. The inference request may also include a request ID that uniquely identifies the inference request and that can be generated on the client side or on the server side.

All inference requests/responses for ML model 125 are received/monitored at 302. A user for each particular inference request would normally expect an inference response generated by ML model 125 in return.

The entire content of the inference request at 302 can be logged using a logging/monitoring system. Logs may be ingested in a logging system which generates monitoring metrics which are ingested in a monitoring system, and generates telemetry data, system event data, etc., which are ingested in various systems. The monitoring system may be implemented by a "Prometheus" based system which collects data from different systems and stores them in a monitoring database. Prometheus collects and stores its metrics as time series data, i.e. metrics information is stored with the timestamp at which it was recorded, alongside optional key-value pairs called labels. The captured data can be plotted in form of dashboards using tools such as "Grafana" dashboard monitoring.

At 304, the inference requests received from a user and corresponding responses provided by the ML model 125 are provided to a model guard and ML pipeline 306 that is triggered/initiated when the number of requests for a particular user exceeds a threshold. In one embodiment, the request/responses are in the form of JavaScript Object Notation ("JSON") messages which are mined from telemetry and logging systems. In embodiments, the request and responses are parsed, individual feature values are extracted, the response is extracted, the request and response are joined into a single entry in the logging system. The ML pipeline 306, once established for a particular user or group of users, captures the data from logging each request and response to/from ML model 125. Embodiments initiate the shadow model training for a particular user based on patterns or counts of the requests as opposed to training for every user, which would generally be too compute intensive.

At 308, in response to initiation from pipeline 306 once a threshold is reached, a parallel shadow model is generated/trained based on the inference requests at 302 from all of different users. Each shadow model is trained on a per user basis (e.g., per client ID) when a certain number of requests from a particular user exceeds a threshold, thereby triggering the generation of the pipeline and the training of the shadow model. The threshold varies based on the type of ML model 125. For generally simple models that are relatively easy to reverse engineer, the threshold can be relatively low. For example, for a "simple" binary logistic regression model, if the dimensionality of the feature vector is "n", only "n+1" linearly independent feature vectors are needed to perfectly extract the original model. Other more complex models may require a more requests and feature vectors (e.g., greater than 100 requests) before they can be reverse engineered. In embodiments, the shadow model training process at 308 is where requests made to the original model 125 are used to periodically train a shadow model with the same algorithm and hyperparameters as the original model.

The shadow model pipeline in conjunction with the shadow model training generates and outputs a risk score/probability at 309. In general, the shadow model pipeline assesses the similarity between the deployed model 125 and the shadow model 308 and issues a warning to a model guard/service 314 when a similarity score exceeds a given value. In one embodiment, the service provider of cloud 104 may have knowledge (e.g., via metadata) of the ML model 125 of interest such as when pre-built models generated by the provider of cloud 104 are used. For example, knowledge of the class of algorithm (e.g., decision tree or logistic regression model), and the hyperparameters of the model. In this embodiment, the shadow model training at 306 is "white box" training so that a shadow model that is very similar to ML model 125 can be fairly quickly built and can provide a conservative threshold for the similarity score disclosed below. In other embodiments, where there is minimal or no knowledge of ML model 125 in advance (i.e., black box knowledge of a model that was generated by a client), then a variety of shadow models can be built and an assessment can be made on which shadow model performs most similar to ML model 125. The shadow model 308 is trained on the requests received at 302—the same requests that are directed to ML model 125.

In embodiments, with both the "white box" and "black box" scenarios, shadow models can be periodically re-trained as more requests are logged for high risk clients. These models can be re-trained based on, for example, a calendar schedule (i.e., every hour, every day, etc.) or whenever a net new number of requests are logged for a particular high risk client (e.g., re-training of shadow model "x" occurs whenever 1000 new requests are logged for high risk client "y").

In embodiments using a black box model, a series of shadow model algorithms can be trained on the requests. The algorithms can span a range of complexity, such as from simple regressors (e.g., logistic regressors) to more complex artificial neural networks. Candidate shadow models can be selected based on their performance on a validation dataset collected from the request data. Further training iterations can help optimize the model parameters and hyperparameters.

At 310, based on the risk score (i.e., the amount of similarity of the responses of the ML model 125 and the shadow model), it is determined whether the requests from a particular user may likely form a reverse engineering attack based on a threshold. The determination is based on comparing aspects of ML model 125 with aspects of the shadow model. In one embodiment, the determination is based on comparing the shadow model responses (i.e., the model predictions) with the original ML model 125 responses. If the two sets of responses are identical, this indicates that the shadow model can reproduce the original ML model 125 with high fidelity and can indicate that the candidate attacker could reverse engineer the ML model 125. This approach is particularly viable in the black box context where there is no knowledge of the original ML model's algorithm, parameters, and hyperparameters, but can also be used in the white box context.

In other embodiments, in the white box context, embodiments leverage the knowledge of the original ML model 125 algorithm and hyperparameters and train a shadow model with the same model algorithm and hyperparameters. The comparison is between one or more of the trained shadow model algorithms, parameters and hyperparameters and one or more of the original model algorithms, parameters and hyperparameters. If the comparisons are close, the candidate attacker could reverse engineer the model. This would be a very conservative approach because it assumes that the attacker also knows the model algorithm and hyperparameters.

In other embodiments, a combination of both approaches can be used to determine similarity between the models.

If yes at 310, at 312 alerts are generated and sent to a model guard service 314. For example, a determination that the responses from the shadow model are identical or nearly identical to the actual responses of ML model 125. For a white box ML model 125, embodiments can use the same training/validation dataset used to validate ML model 125 and see if the shadow model returns the same predictions/responses as the prediction model to generate accuracy score.

At 316, it is determined if a real alert is present and a threshold is breached, an attack on ML model 125 is indicated. Alerts can be sent to the "owner" of ML model 125 if the model is not "owned" by cloud 104. If an attack is determined, at 320, prediction responses from further requests from the user are blocked and that attack is reported. If there is not a determination of an attack, at 318 the prediction response to the request is provided to the user, and the user has no indication of any model guarding activity.

Model guard 314 acts on the alert by preventing high-risk clients from reversing the model. This can be done by a combination of one or more of the following protective measures:

Removing all class probabilities for classification problems;
Only returning the predicted class label;
Adding noise to the prediction probabilities;
Throttling the requests;
Blocking the requests; or
Replacing the model.

request/response patterns, nearest neighbor analysis or supervised/traditional ones algorithms such as anomaly detection, fraud detection or ensemble learning. The algorithms can also be considered ML models, and can be used to directly assess a risk and generate a score at 310 or to identify clients that require a shadow model.

In connection with 306, in embodiments, the reverse engineering requests decision (i.e., whether a reverse engineering attack may be being attempted) is based on a probability score. The first part of identifying reverse engineering is to understand user behavior. In one embodiment, a clustering algorithm which is unsupervised is used to find the user activity over time. The user activity is captured per number of inference requests and requests per time. The larger the requests per time, the larger the cluster size. This may capture a lot of spurious request patterns such as bot-based requests. However advanced attackers may use different methods to send requests by patiently waiting over a time to overcome detection methods. Therefore, embodiments further line up the clusters over a time horizon to filter by the same user and understand the impact analysis of features mined.

Figure 4:
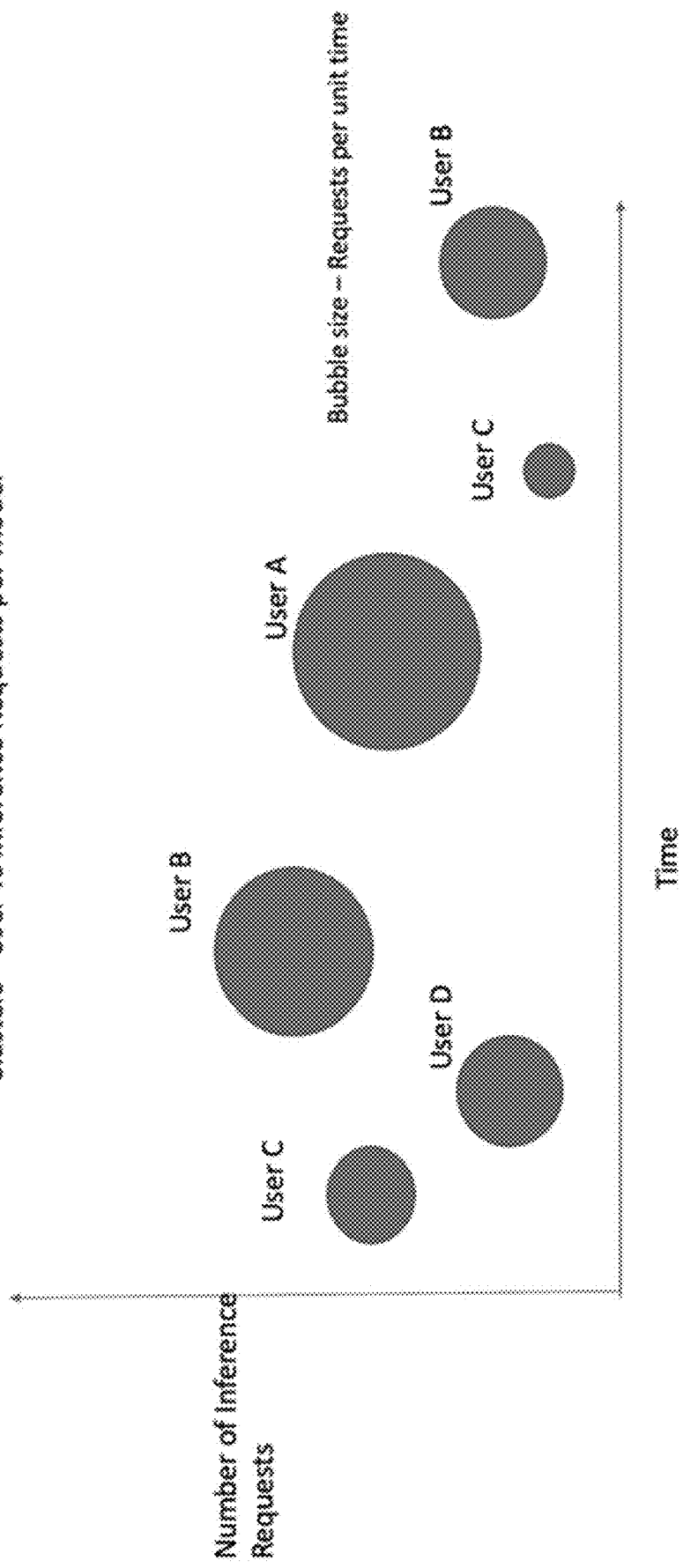
FIG. 4 illustrates an example clustering of inference requests in accordance with embodiments to detect reverse engineering.

FIG. 4 illustrates an example clustering of inference requests in accordance with embodiments to detect reverse engineering. The clustering is performed per model and per user. The bubble sizes are based on the number of requests per unit time. FIG. 4 is used to understand the user pattern of requests to determine whether a shadow model is needed for a particular user. However, if an unreasonable pattern across users is found, it can be flagged as an anomaly Table 1 below provides an example of determining at 310 using the trained shadow model to determine whether a reverse engineering is taking place. In the example of Table 1, the requests coming from a user (User "OCID") to a model (Model "OCID") are captured by features and processed for correlation with respect to data and algorithm. The example is for a ML model 125 that provides a credit default prediction, and the three features (i.e., the feature vector which is part of the inference request at 302) include input parameters for "income type" (e.g., individual), "credit score" and "customer segment". Initially, embodiments use linear correlation methods and score the type of inference requests (i.e., fraudulent or legitimate requests).

TABLE 1

| Timestamp | User OCID | Mode OCID | Request Input Parameter1 (e.g., Income Type) | Request Input Parameter2 (e.g., Credit Score) | Request Input Parameter3 (e.g., Customer Segment) | Request Output Parameter (e.g., Default probability score) |
|---|---|---|---|---|---|---|
| T1 | UOCID1 | MOCID1 | Individual | 600 | Retail | 0.3 |
| T2 | UCOCID2 | MOCID1 | Individual | 630 | Retail | 0.4 |
| ... | ... | ... | ... | ... | ... | ... |

In embodiments, as an alternative to training shadow models to detect a reverse engineering attack, the requests and responses at 302 can be used to directly profile and classify the client behavior to determine a risk threshold and an alert. An algorithm is trained using the prediction request and response information such as: (1) The prediction output distribution analysis over a time period, to understand patterns based on time of the request, frequency, and user profile; (2) Temporal variation of input values; and (3) Temporal correlation of input values. Algorithms used can include unsupervised algorithms such as clustering based on Embodiments use the time series-based analysis per user on the activity tracking as in Table 1 through the following scoring with values ranging from 1-10:

Feature importance/weights identification—increase/decrease variables frequency;
Feature correlation identification—changing variables through a combination of attempts;
Data type analysis—categorical, numerical, encoding identification, etc.
Algorithm identification—Decision tree, deep learning, Linear regression et al based on above activities.

The above examples are considered comparison parameters that are used to compare the shadow model with the ML model under attack. The shadow model is an attack pattern and if there is a match to an actual model embodiments can determine the degree of similarity to mine the information about the model based on the comparison aspects. The similarity is based on the values of the variables which are part of the actual model used in training and the shadow model which is built on inference request. The actual model training data can be compared to see how close or different the shadow model is from the ML model 125 under attack.

Embodiments determine reverse engineering risk score based on the above scoring, with the risk score ranging from 0-100%, with zero means no/less risk and 100% is high risk.

In one embodiment, the risk score is determined as follows:

Reverse engineering risk score=(((User profile activity)+(Feature importance activity)+(Feature correlation activity)+(Data type activity)+(Algorithm identification activity))/50)*100

The user activity is derived from the clustering, such as shown in FIG. 3. For example, the larger the cluster size over a period the greater the possibility of suspicious activity. Similarly, the feature impact analysis of the request can be done to understand whether any mining activity is happening for every request.

In embodiments, the risk score is logged periodically from the pipeline 306 to monitor for the customer tenancy per model. The logging can be initiated based on combining outputs of the shadow model and clustering and applying the above risk score formula to determine the overall risk score. In other embodiments, more advanced modeling is implemented through supervised or deep learning shadow models that are trained via an inference pipeline for request and responses, including user activity anomaly detection, multi class classification, decision tree, ensemble methods, and neural networks. These are types of algorithms using the shadow model to determine the risk score in a more sophisticated way than using the risk score algorithm above.

Embodiments can also make a global risk assessment from evaluating all the requests from all users. Actions can then be taken globally to minimize risk across users. The user requests across multiple tenancies and regions can be monitored through a logging and telemetry system. Further, instead of a single user, a particular group of users that form a single tenancy may be identified. A user group trying to perform a particular type of request can be identified via clustering.

Example Cloud Infrastructure

FIGS. 5-8 illustrate an example cloud infrastructure that can incorporate the secure on-premises to cloud connector framework system in accordance to embodiments. The cloud infrastructure of FIG. 5-8 can be used to implement network/cloud 104 of FIG. 1 and host ML model guard system 10.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS"s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
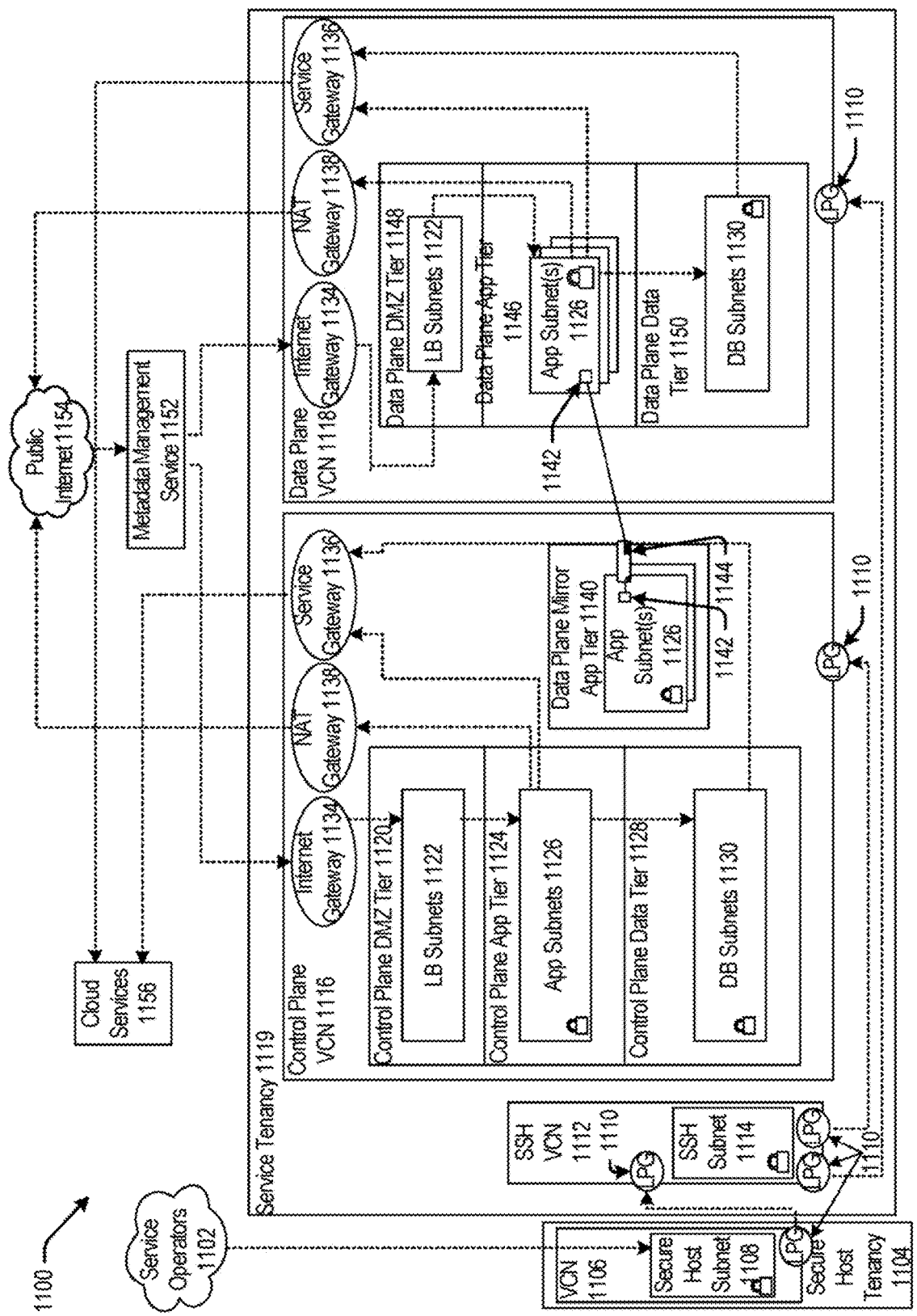
FIGS. 5-8 illustrate an example cloud infrastructure that can incorporate the secure on-premises to cloud connector framework system in accordance to embodiments.

FIG. 5 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 6:
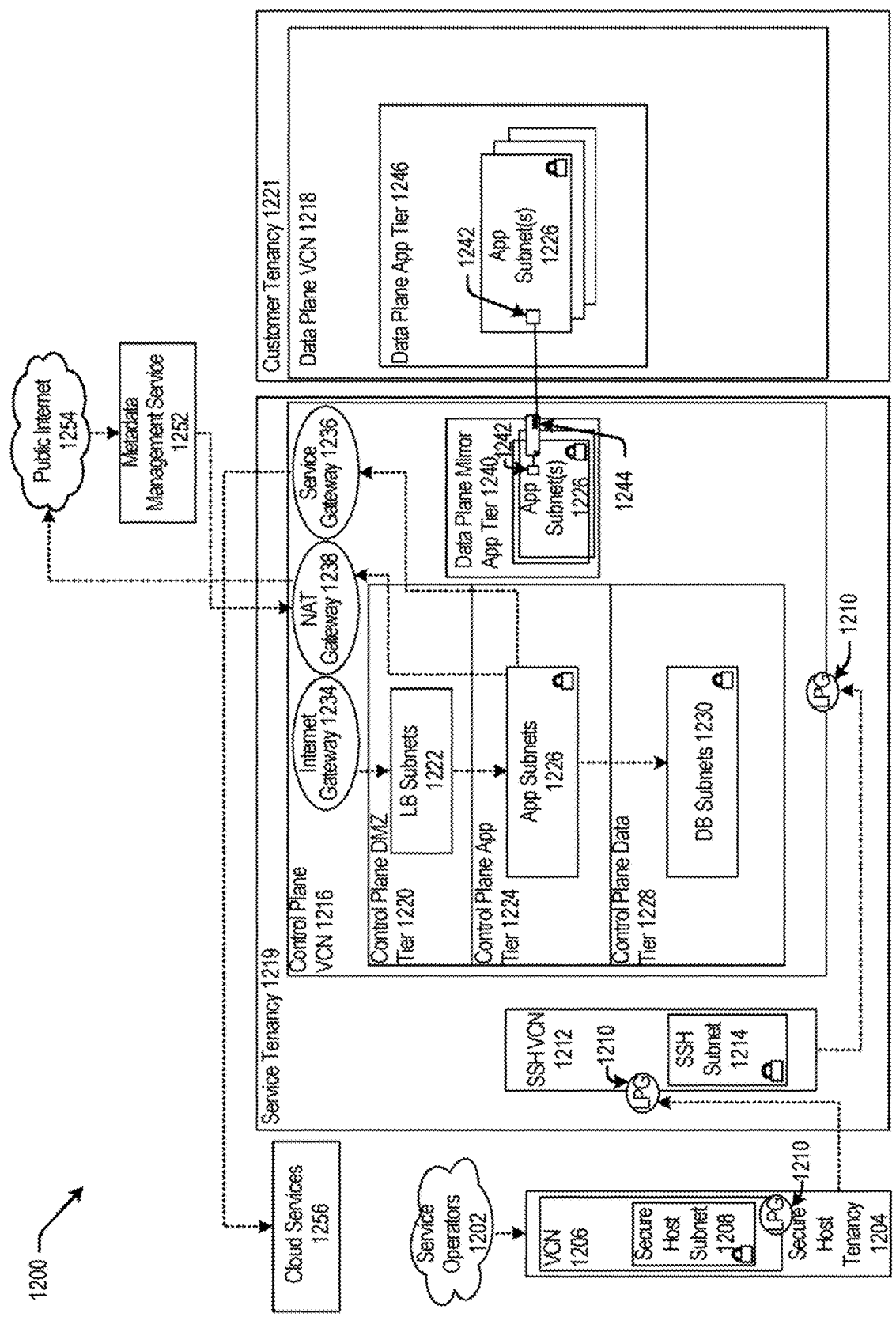

FIG. 6 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 7:
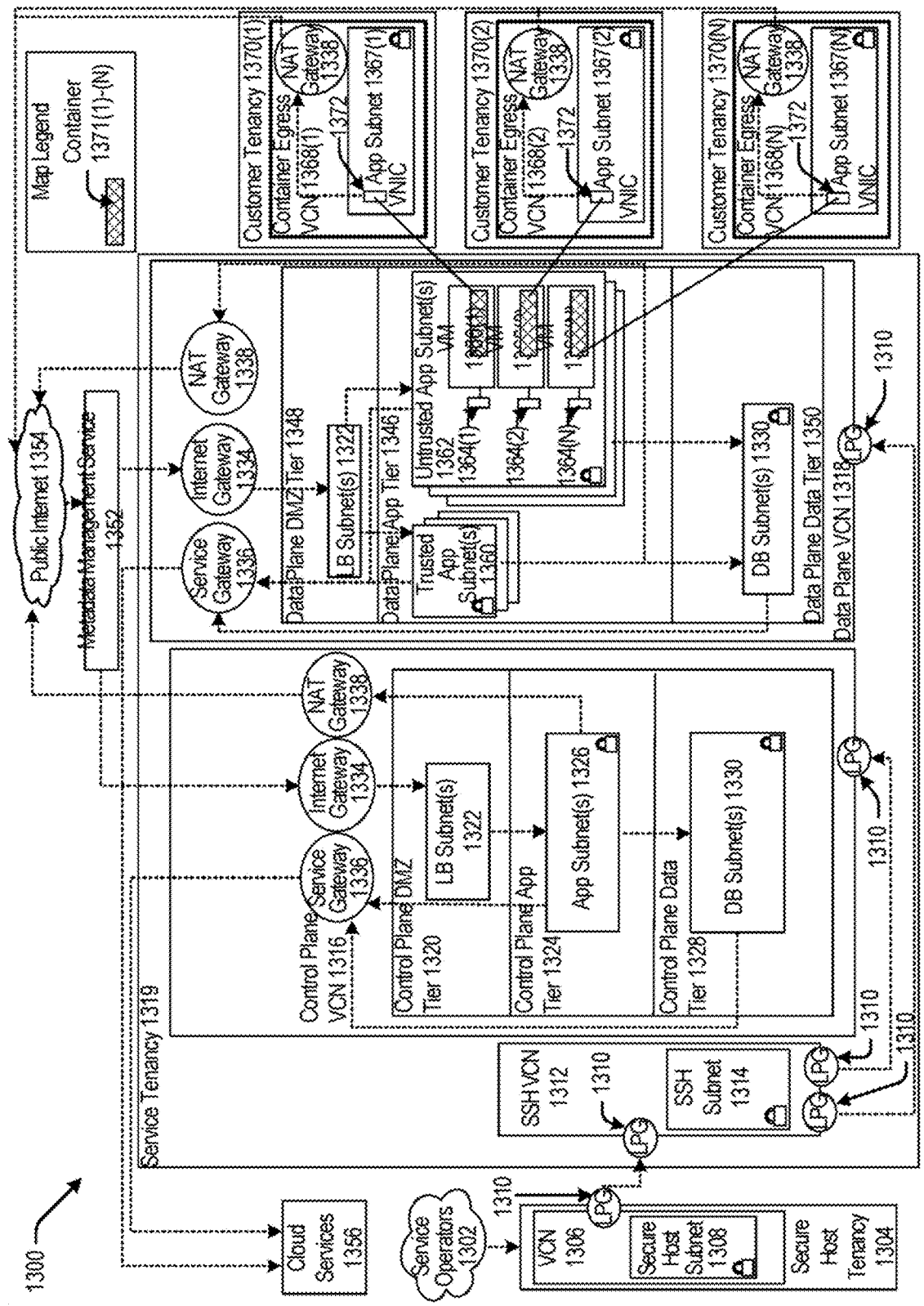

FIG. 7 is a block diagram 1300 illustrating another example pattern of an IaaS architecture, according to at least one embodiment. Service operators 1302 (e.g. service operators 1102) can be communicatively coupled to a secure host tenancy 1304 (e.g. the secure host tenancy 1104) that can include a virtual cloud network (VCN) 1306 (e.g. the VCN 1106) and a secure host subnet 1308 (e.g. the secure host subnet 1108). The VCN 1306 can include an LPG 1310 (e.g. the LPG 1110) that can be communicatively coupled to an SSH VCN 1312 (e.g. the SSH VCN 1112) via an LPG 1310 contained in the SSH VCN 1312. The SSH VCN 1312 can include an SSH subnet 1314 (e.g. the SSH subnet 1114), and the SSH VCN 1312 can be communicatively coupled to a control plane VCN 1316 (e.g. the control plane VCN 1116) via an LPG 1310 contained in the control plane VCN 1316 and to a data plane VCN 1318 (e.g. the data plane 1118) via an LPG 1310 contained in the data plane VCN 1318. The control plane VCN 1316 and the data plane VCN 1318 can be contained in a service tenancy 1319 (e.g. the service tenancy 1119).

The control plane VCN 1316 can include a control plane DMZ tier 1320 (e.g. the control plane DMZ tier 1120) that can include load balancer ("LB") subnet(s) 1322 (e.g. LB subnet(s) 1122), a control plane app tier 1324 (e.g. the control plane app tier 1124) that can include app subnet(s) 1326 (e.g. similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g. the service gateway) and a network address translation (NAT) gateway 1338 (e.g. the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g. the data plane DMZ tier 1148), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 8:
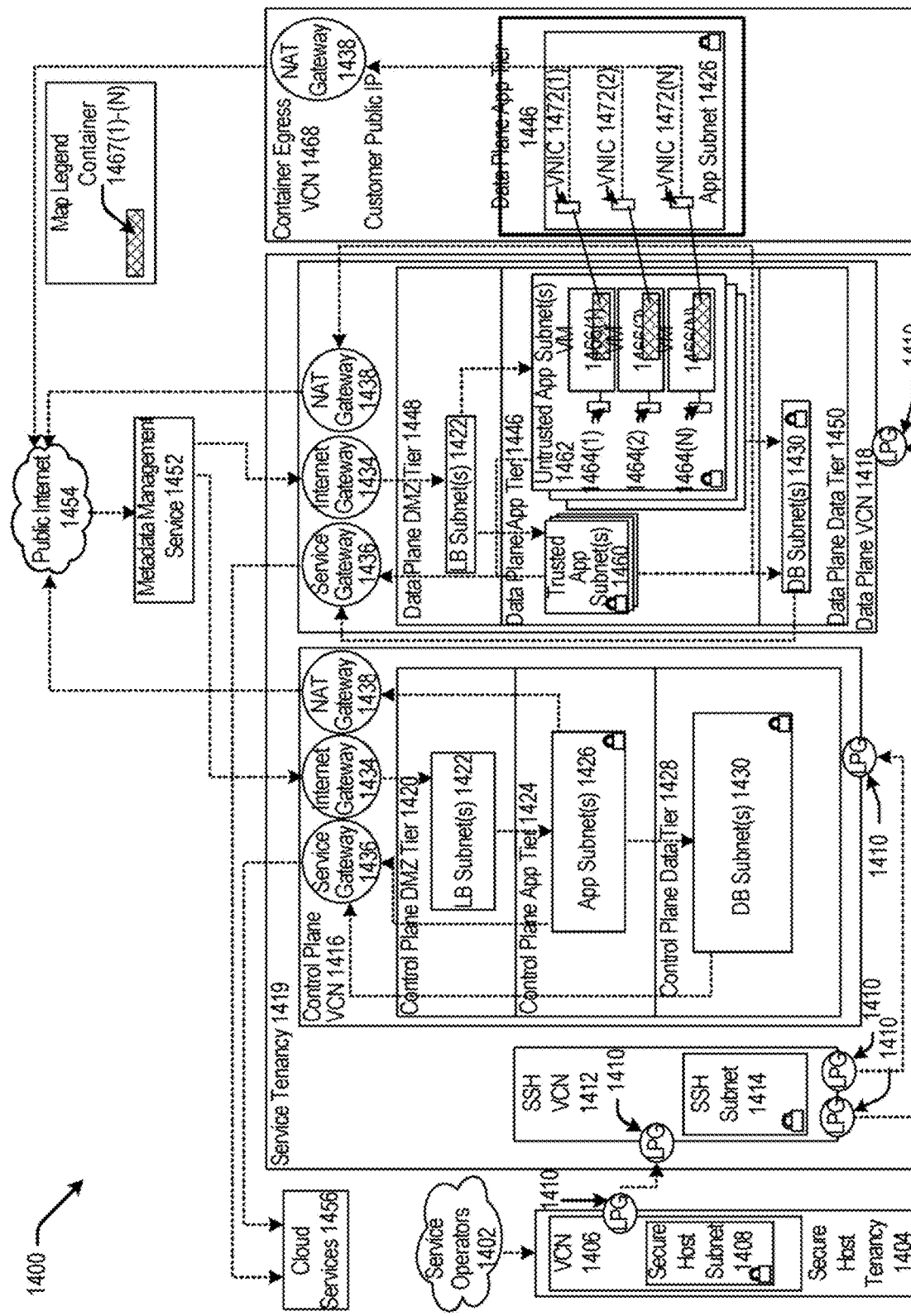

FIG. 8 is a block diagram 1400 illustrating another example pattern of an IaaS architecture, according to at least one embodiment. Service operators 1402 (e.g. service operators 1102) can be communicatively coupled to a secure host tenancy 1404 (e.g. the secure host tenancy 1104) that can include a virtual cloud network ("VCN") 1406 (e.g. the VCN 1106) and a secure host subnet 1408 (e.g. the secure host subnet 1108). The VCN 1406 can include an LPG 1410 (e.g. the LPG 1110) that can be communicatively coupled to an SSH VCN 1412 (e.g. the SSH VCN 1112) via an LPG 1410 contained in the SSH VCN 1412. The SSH VCN 1412 can include an SSH subnet 1414 (e.g. the SSH subnet 1114), and the SSH VCN 1412 can be communicatively coupled to a control plane VCN 1416 (e.g. the control plane VCN 1116) via an LPG 1410 contained in the control plane VCN 1416 and to a data plane VCN 1418 (e.g. the data plane 1118) via an LPG 1410 contained in the data plane VCN 1418. The control plane VCN 1416 and the data plane VCN 1418 can be contained in a service tenancy 1419 (e.g. the service tenancy 1119).

The control plane VCN 1416 can include a control plane DMZ tier 1420 (e.g. the control plane DMZ tier 1120) that can include LB subnet(s) 1422 (e.g. LB subnet(s) 1122), a control plane app tier 1424 (e.g. the control plane app tier 1124) that can include app subnet(s) 1426 (e.g. app subnet(s) 1126), a control plane data tier 1428 (e.g. the control plane data tier 1128) that can include DB subnet(s) 1430 (e.g. DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146), a data plane DMZ tier 1448 (e.g. the data plane DMZ tier 1148), and a data plane data tier 1450 (e.g. the data plane data tier 1150). The data plane DMZ tier 1448 can include LB subnet(s) 1422 that can be communicatively coupled to trusted app subnet(s) 1460 (e.g. trusted app subnet(s) 1360) and untrusted app subnet(s) 1462 (e.g. untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154).

The Internet gateway 1434 contained in the control plane VCN 1416 and contained in the data plane VCN 1418 can be communicatively coupled to a metadata management service 1452 (e.g. the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 13 may be considered an exception to the pattern illustrated by the architecture of block diagram 1300 of FIG. 8 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

As disclosed, embodiments thwart ML model reverse engineering attacks by generating a shadow ML model and comparing the predictions from the ML model of interest and the shadow model, both trained by the same requests/response from a suspicious user. The attach can be thwarted once a level of similarity of the responses between the ML model and shadow model exceed a certain threshold.

Embodiments prevent security attacks on deployed machine learning models. Embodiments enhance compliance and standards of a machine learning pipeline. Embodiments prevent breach of sensitive training information and model assets on a cloud based platform, and even models on other platforms which can use the model guard system remotely.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure ("OCI") provided by the present assignee.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of preventing a reverse engineering attack on a cloud based trained machine learning (ML) model, the method comprising:
   receiving a first set of inference requests from a plurality of cloud users to the trained ML model;
   based on the first set of inference requests, identifying a first user attempting to attack the trained ML model;
   in response to the identifying, generating and training a shadow model that is similar to the trained ML model, training the shadow model using further inference requests from the plurality of cloud users to the trained ML model;
   receiving a second set of inference requests from the first user to the trained ML model;
   in response to the second set of inference requests, generating trained ML model set of responses and a trained shadow model set of responses;
   comparing the trained ML model set of responses with the trained shadow model set of responses; and
   based on the comparison, determining whether the first user is attempting the reverse engineering attack on the trained ML model.

2. The method of claim 1, wherein the identifying the first user attempting to attack the ML model comprises clustering the first set of requests per user and per unit time.

3. The method of claim 1, wherein the ML model comprises an algorithm and hyperparameters, and the generating the shadow model that is similar to the ML model is based at least on the algorithm and hyperparameters;
the comparing comprising comparing one or more of a shadow model algorithm, shadow model parameters and shadow model hyperparameters with one or more of an ML model algorithm, ML model parameters and ML model hyperparameters.

4. The method of claim 1, wherein the ML model comprises an algorithm and hyperparameters, and the generating the shadow model that is similar to the ML model is generated without knowledge of the algorithm and the hyperparameters.

5. The method of claim 1, the comparing the ML model set of responses with the shadow model set of responses comprises determining a risk score comprising an amount of similarity between the ML model and the shadow model.

6. The method of claim 5, the risk score based on one or more comparison parameters comprising: user profile activity, feature importance activity, feature correlation activity, data type activity and algorithm identification activity.

7. The method of claim 1, further comprising generating an alert to a model guard when it is determined whether the first user is attempting the reverse engineering attack on the ML model.

8. The method of claim 7, wherein in response to the alert, the model guard preventing the reverse engineering attack by executing at least one of the following protective measures in response to further requests from the first user: removing all class probabilities for classification problems, only returning a predicted class label, adding noise to prediction probabilities, throttling the further requests, or blocking the further requests.

9. A non-transitory computer readable medium having instructions stored thereon that, when executed by one or more processors, cause the processors to prevent a reverse engineering attack on a cloud based trained machine learning (ML) model, the preventing comprising:
receiving a first set of inference requests from a plurality of cloud users to the trained ML model;
based on the first set of inference requests, identifying a first user attempting to attack the trained ML model;
in response to the identifying, generating and training a shadow model that is similar to the trained ML model, training the shadow model using further inference requests from the plurality of cloud users to the trained ML model;
receiving a second set of inference requests from the first user to the trained ML model;
in response to the second set of inference requests, generating trained ML model set of responses and a trained shadow model set of responses;
comparing the trained ML model set of responses with the trained shadow model set of responses; and
based on the comparison, determining whether the first user is attempting the reverse engineering attack on the trained ML model.

10. The computer readable medium of claim 9, wherein the identifying the first user attempting to attack the ML model comprises clustering the first set of requests per user and per unit time.

11. The computer readable medium of claim 9, wherein the ML model comprises an algorithm and hyperparameters, and the generating the shadow model that is similar to the ML model is based at least on the algorithm and hyperparameters;
the comparing comprising comparing one or more of a shadow model algorithm, shadow model parameters and shadow model hyperparameters with one or more of an ML model algorithm, ML model parameters and ML model hyperparameters.

12. The computer readable medium of claim 9, wherein the ML model comprises an algorithm and hyperparameters, and the generating the shadow model that is similar to the ML model is generated without knowledge of the algorithm and the hyperparameters.

13. The computer readable medium of claim 9, the comparing the ML model set of responses with the shadow model set of responses comprises determining a risk score comprising an amount of similarity between the ML model and the shadow model.

14. The computer readable medium of claim 13, the risk score based on one or more comparison parameters comprising: user profile activity, feature importance activity, feature correlation activity, data type activity and algorithm identification activity.

15. The computer readable medium of claim 9, the preventing further comprising generating an alert to a model guard when it is determined whether the first user is attempting the reverse engineering attack on the ML model.

16. The computer readable medium of claim 15, wherein in response to the alert, the model guard preventing the reverse engineering attack by executing at least one of the following protective measures in response to further requests from the first user: removing all class probabilities for classification problems, only returning a predicted class label, adding noise to prediction probabilities, throttling the further requests, or blocking the further requests.

17. A cloud infrastructure comprising:
a cloud based trained machine learning (ML) model;
an ML model guard server coupled to the ML model, the ML model guard server configured to prevent a reverse engineering attack on the ML model, the preventing comprising:
receiving a first set of inference requests from a plurality of cloud users to the trained ML model;
based on the first set of inference requests, identifying a first user attempting to attack the trained ML model;
in response to the identifying, generating and training a shadow model that is similar to the trained ML model, training the shadow model using further inference requests from the plurality of cloud users to the trained ML model;
receiving a second set of inference requests from the first user to the trained ML model;
in response to the second set of inference requests, generating trained ML model set of responses and a trained shadow model set of responses;
comparing the trained ML model set of responses with the trained shadow model set of responses; and
based on the comparison, determining whether the first user is attempting the reverse engineering attack on the trained ML model.

18. The cloud infrastructure of claim 17, wherein the identifying the first user attempting to attack the ML model comprises clustering the first set of requests per user and per unit time.

19. The cloud infrastructure of claim 17, wherein the ML model comprises an algorithm and hyperparameters, and the generating the shadow model that is similar to the ML model is based at least on the algorithm and hyperparameters;

the comparing comprising comparing one or more of a shadow model algorithm, shadow model parameters and shadow model hyperparameters with one or more of an ML model algorithm, ML model parameters and ML model hyperparameters.

20. The cloud infrastructure of claim 17, wherein the ML model comprises an algorithm and hyperparameters, and the generating the shadow model that is similar to the ML model is generated without knowledge of the algorithm and the hyperparameters.

* * * * *

UNITED STATES PATENT AND TRADEMARK OFFICE
CERTIFICATE OF CORRECTION

PATENT NO. : 12,050,669 B2  
APPLICATION NO. : 17/685577  
DATED : July 30, 2024  
INVENTOR(S) : Sankaranarayanan et al.

Page 1 of 1

It is certified that error appears in the above-identified patent and that said Letters Patent is hereby corrected as shown below:

In the Specification

In Column 4, Line 12, delete "by" and insert -- be --, therefor.

In Column 10, Line 32, delete "anomaly" and insert -- anomaly. --, therefor.

In Column 11, Line 56, delete "FIG." and insert -- FIGS. --, therefor.

In the Claims

In Column 22, Line 61, in Claim 1, after "generating" insert -- a --, therefor.

In Column 23, Line 55, in Claim 9, after "generating" insert -- a --, therefor.

In Column 24, Line 55, in Claim 17, after "generating" insert -- a --, therefor.

Signed and Sealed this  
Tenth Day of December, 2024

Katherine Kelly Vidal  
*Director of the United States Patent and Trademark Office*